US012779549B2

(12) United States Patent
Iwasaki et al.

(10) Patent No.: US 12,779,549 B2
(45) Date of Patent: Nov. 3, 2026

(54) SINTERED MATERIAL AND CUTTING TOOL

(71) Applicant: SUMITOMO ELECTRIC HARDMETAL CORP., Hyogo (JP)

(72) Inventors: Hirotsugu Iwasaki, Hyogo (JP); Akihiko Ueda, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 396 days.

(21) Appl. No.: 18/038,794

(22) PCT Filed: Nov. 29, 2021

(86) PCT No.: PCT/JP2021/043683

§ 371 (c)(1),
(2) Date: May 25, 2023

(87) PCT Pub. No.: WO2022/114192

PCT Pub. Date: Jun. 2, 2022

(65) Prior Publication Data

US 2024/0091862 A1 Mar. 21, 2024

(30) Foreign Application Priority Data

Nov. 30, 2020 (JP) ................................ 2020-198393

(51) Int. Cl.
*B23B 27/14* (2006.01)
*B22F 3/14* (2006.01)
(Continued)

(52) U.S. Cl.
CPC .............. *B23B 27/148* (2013.01); *B22F 3/14* (2013.01); *B22F 5/00* (2013.01); *B22F 9/04* (2013.01);
(Continued)

(58) Field of Classification Search
CPC .............. C04B 2235/427; C04B 35/52; C04B 2235/785; C04B 2235/786; C04B 35/6303; C04B 2235/72; C04B 2235/421; C04B 2235/5436; C04B 2235/80; C04B 2235/40; C04B 2235/5445; B22F 2005/001; B22F 2999/00; B22F 2302/406; B22F 7/06; B23B 27/20; B23B 2226/31; B23B 27/148; B23B 27/14
See application file for complete search history.

(56) References Cited

U.S. PATENT DOCUMENTS

2010/0320423 A1 12/2010 Tajima et al.
2015/0136495 A1 5/2015 Knuteson et al.

FOREIGN PATENT DOCUMENTS

EP 0982276 A1 * 3/2000 ............. C22C 26/00
EP 1340737 A2 9/2003
(Continued)

*Primary Examiner* — Amber R Orlando
*Assistant Examiner* — Ryan Patrick Loughran
(74) *Attorney, Agent, or Firm* — Renner, Otto, Boisselle & Sklar, LLP

(57) ABSTRACT

A sintered material includes diamond grains and a binder. A boron concentration in the diamond grains is more than or equal to 0.001 mass % and less than or equal to 0.9 mass %. A boron concentration in the binder is more than or equal to 0.5 mass % and less than or equal to 40 mass %.

8 Claims, 3 Drawing Sheets

(51) Int. Cl.
*B22F 5/00* (2006.01)
*B22F 9/04* (2006.01)
*C22C 1/05* (2023.01)
*C22C 26/00* (2006.01)

(52) U.S. Cl.
CPC ................ *C22C 1/05* (2013.01); *C22C 26/00* (2013.01); *B22F 2005/001* (2013.01); *B22F 2302/406* (2013.01); *B22F 2998/10* (2013.01); *B22F 2999/00* (2013.01); *B23B 2226/31* (2013.01)

(56) References Cited

FOREIGN PATENT DOCUMENTS

| | | | | | |
|---|---|---|---|---|---|
| JP | S58-199777 A | | 11/1983 | | |
| JP | 2003-291036 A | | 10/2003 | | |
| JP | 2005-220015 A | | 8/2005 | | |
| JP | 2006-502955 A | | 1/2006 | | |
| JP | 2008-133172 A | | 6/2008 | | |
| JP | 2008-133173 A | | 6/2008 | | |
| JP | 2012126605 A | * | 7/2012 | | |
| JP | 2019-006662 A | | 1/2019 | | |
| KR | 20090082260 A | | 7/2009 | | |
| WO | 2004/035197 A | | 4/2004 | | |
| WO | WO-2004035197 A1 | * | 4/2004 | ........... | C04B 35/645 |

* cited by examiner

SINTERED MATERIAL AND CUTTING TOOL

TECHNICAL FIELD

The present disclosure relates to a sintered material and a cutting tool. This application claims priority based on Japanese Patent Application No. 2020-198393 filed on Nov. 30, 2020, the entire contents of which are incorporated herein by reference.

BACKGROUND ART

PTL 1 (Japanese Patent Laying-Open No. 2008-133172) discloses a sintered material. The sintered material disclosed in PTL 1 is formed by mixing powdered diamond doped with boron and powdered carbonate, and then, heating and pressurizing a mixture thereof.

PTL 2 (Japanese Patent Laying-Open No. 58-199777) discloses a sintered material. The sintered material disclosed in PTL 2 is formed by mixing powdered diamond and powdered catalytic metal, and then, heating and pressurizing a mixture thereof. The powdered catalytic metal contains powdered boron carbide and powdered metal (e.g., iron, nickel, cobalt).

CITATION LIST

Patent Literature

PTL 1: Japanese Patent Laying-Open No. 2008-133172
PTL 2: Japanese Patent Laying-Open No. 58-199777

SUMMARY OF INVENTION

A sintered material of the present disclosure includes diamond grains and a binder. A boron concentration in the diamond grains is more than or equal to 0.001 mass % and less than or equal to 0.9 mass %. A boron concentration in the binder is more than or equal to 0.5 mass % and less than or equal to 40 mass %.

DETAILED DESCRIPTION

Figure 1:
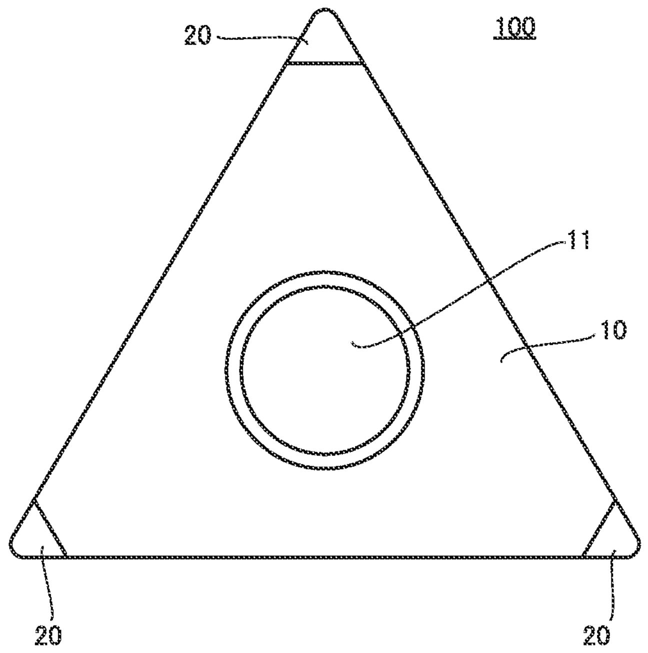
FIG. 1 is a plan view of a cutting insert 100.

Problem to be Solved by the Present Disclosure

As a result of intensive study, the present inventors have found that there is room for improvement in the life of a cutting tool when the sintered material disclosed in PTL 1 and the sintered material disclosed in PTL 2 are applied to a cutting tool. The present disclosure provides a sintered material that can lead to improved tool life when the sintered material is applied to a cutting tool.

Advantageous Effect of the Present Disclosure

The sintered material according to the present disclosure can lead to improved tool life when the sintered material is applied to a cutting tool.

DESCRIPTION OF EMBODIMENTS OF THE PRESENT DISCLOSURE

First, embodiments of the present disclosure are listed and described.

(1) A sintered material according to one embodiment includes diamond grains and a binder. A boron concentration in the diamond grains is more than or equal to 0.001 mass % and less than or equal to 0.9 mass %. A boron concentration in the binder is more than or equal to 0.5 mass % and less than or equal to 40 mass %.

The sintered material according to (1) can lead to improved tool life when the sintered material is applied to a cutting tool.

(2) In the sintered material according to (1), the boron concentration in the diamond grains may be more than or equal to 0.005 mass % and less than or equal to 0.1 mass %. The boron concentration in the binder may be more than or equal to 0.6 mass % and less than or equal to 33 mass %.

The sintered material according to (2) can lead to further improved tool life when the sintered material is applied to a cutting tool.

(3) In the sintered material according to (1) or (2), an average grain size of the diamond grains may be more than or equal to 0.1 μm and less than or equal to 50 μm. A ratio of the diamond grains in the sintered material may be more than or equal to 80 volume % and less than or equal to 99 volume %.

(4) In the sintered material according to (1) to (3), the binder may include at least one selected from the group consisting of a simple metal, an alloy, and an intermetallic compound. The simple metal, the alloy, and the intermetallic compound may include at least one metallic element selected from the group consisting of a group 4 element in a periodic table, a group 5 element in the periodic table, a group 6 element in the periodic table, iron, aluminum, silicon, cobalt, and nickel.

(5) In the sintered material according to (1) to (3), the binder may include at least one selected from the group consisting of a compound and a solid solution derived from the compound. The compound may include at least one selected from the group consisting of a simple metal, an alloy, and an intermetallic compound, and at least one selected from the group consisting of nitrogen, carbon, and oxygen. The simple metal, the alloy, and the intermetallic compound may include at least one metallic element selected from the group consisting of a group 4 element in a periodic table, a group 5 element in the periodic table, a group 6 element in the periodic table, iron, aluminum, silicon, cobalt, and nickel.

(6) In the sintered material according to (1) to (5), the binder may include at least cobalt.

(7) A cutting tool according to one embodiment includes a cutting edge portion. The cutting edge portion is made of the sintered material according to (1) to (6).

The cutting tool according to (7) can have improved tool life.

Detailed Description of Embodiments of the Present Disclosure

The details of embodiments of the present disclosure will be described with reference to the drawings. In the following drawings, the same or corresponding portions are denoted by the same reference numerals, and redundant description will not be repeated.

A cutting tool according to an embodiment is, for example, a cutting insert 100. Although the cutting tool according to the embodiment is not limited to cutting insert 100, description will be given below by taking cutting insert 100 as the cutting tool according to the embodiment.

(Structure of Cutting Tool According to Embodiment)

A structure of cutting insert 100 will be described.

<Schematic Structure of Cutting Insert 100>

Figure 2:
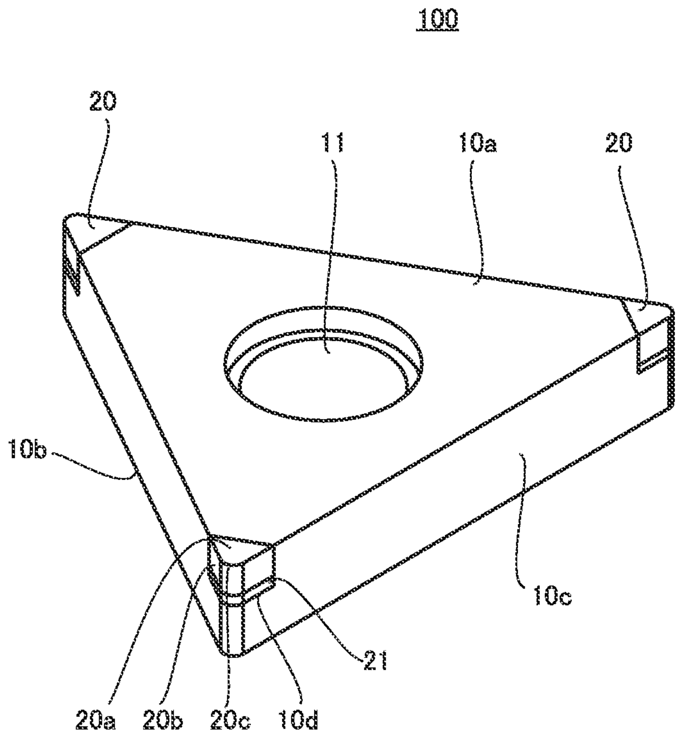
FIG. 2 is a perspective view of cutting insert 100.

FIG. 1 is a plan view of cutting insert 100. FIG. 2 is a perspective view of cutting insert 100. As shown in FIGS. 1 and 2, cutting insert 100 includes a substrate 10 and cutting edge portions 20. Cutting insert 100 has a polygonal shape (e.g., triangular shape) in plan view. The polygonal shape (triangular shape) may not be an exact polygonal shape (triangular shape). More specifically, cutting insert 100 may have rounded corners in plan view.

Substrate 10 has a polygonal shape (e.g., triangular shape) in plan view. Substrate 10 has a top surface 10*a*, a bottom surface 10*b*, and a side surface 10*c*. Top surface 10*a* and bottom surface 10*b* are end surfaces in the thickness direction of substrate 10. Bottom surface 10*b* is opposite to top surface 10*a* in the thickness direction of substrate 10. Side surface 10*c* is a surface contiguous to top surface 10*a* and bottom surface 10*b*.

Top surface 10*a* includes attachment portions 10*d*. Attachment portion 10*d* is positioned in a corner of top surface 10*a* in plan view. The distance between top surface 10*a* and bottom surface 10*b* in attachment portion 10*d* is smaller than the distance between top surface 10*a* and bottom surface 10*b* other than in attachment portion 10*d*. In other words, there is a level difference between attachment portion 10*d* and the portion of top surface 10*a* other than attachment portion 10*d*.

Substrate 10 has a through-hole 11. Through-hole 11 passes through substrate 10 in the thickness direction. Through-hole 11 is formed at the center of substrate 10 in plan view. Cutting insert 100 is, for example, provided for cutting by inserting a fixing member (not shown) into through-hole 11 and fastening the fixing member to a tool holder (not shown). However, substrate 10 may not have through-hole 11.

Substrate 10 is made of, for example, a cemented carbide. The cemented carbide is a composite material obtained by sintering carbide grains and a binder. The carbide grains are grains of, for example, tungsten carbide, titanium carbide, tantalum carbide, or the like. The binder is, for example, cobalt, nickel, iron, or the like. However, substrate 10 may be made of a material other than the cemented carbide.

Cutting edge portion 20 is attached to attachment portion 10*d*. Cutting edge portion 20 is attached to substrate 10 by, for example, brazing. Cutting edge portion 20 has a rake face 20*a*, a flank face 20*b*, and a cutting edge 20*c*. Rake face 20*a* is contiguous to a portion of top surface 10*a* other than attachment portion 10*d*. Flank face 20*b* is contiguous to side surface 10*c*. Cutting edge 20*c* is formed at a ridgeline between rake face 20*a* and flank face 20*b*. A back metal 21 may be placed on a bottom surface of cutting edge portion 20 (an opposite surface to rake face 20*a*). Back metal 21 is made of, for example, a cemented carbide.

<Detailed Structure of Sintered Material of Cutting Edge Portion 20>

Cutting edge portion 20 is made of a sintered material including diamond grains and a binder. The average grain size of the diamond grains in the sintered material of cutting edge portion 20 is preferably more than or equal to 0.1 μm and less than or equal to 50 μm. The ratio (volume ratio) of the diamond grains in the sintered material of cutting edge portion 20 is preferably more than or equal to 80 volume % and less than or equal to 99 volume %. The binder includes, for example, cobalt. The binder may include titanium in addition to cobalt. The component with the highest content in the binder is preferably cobalt.

The average grain size of the diamond grains in the sintered material of cutting edge portion 20 is calculated by the following method.

In the calculation of the average grain size of the diamond grains in the sintered material of cutting edge portion 20, first, a sample including a cross section is cut at any position of cutting edge portion 20. Cutting of the sample is performed with, for example, a focused ion beam system or a cross polisher.

Second, the cross section of the cut sample is observed under a scanning electron microscope (SEM). Through this observation, a backscattered electron image (referred to as "SEM image" below) in the cross section of the cut sample is obtained. In the observation under the SEM, magnification is adjusted such that 100 or more diamond grains are included in a measured view. SEM images are obtained at five locations in the cross section of the cut sample.

Third, image processing is performed on the SEM image, thereby obtaining the distribution of grain sizes of the diamond grains included in the measured view. This image processing is performed with, for example, Win ROOF ver. 7.4.5 or WinROOF2018 available from Mitani Corporation. The grain size of each diamond grain is obtained by calculating an equivalent circle diameter from the area of each diamond grain obtained as a result of image processing. In obtaining the distribution of the grain sizes of diamond grains, diamond grains partially outside the measured view are not taken into account.

Fourth, the median size of diamond grains included in the measured view is determined from the distribution of the grain sizes of diamond grains included in the measured view obtained as described above. A value obtained by averaging the determined median sizes of five SEM images is considered as the average grain size of diamond grains in the sintered material of cutting edge portion 20.

The ratio of diamond grains in the sintered material of cutting edge portion 20 is calculated by the following method.

In the calculation of the ratio of diamond grains in the sintered material of cutting edge portion 20, first, a sample including a cross section is cut at any position of cutting edge portion 20. The sample is cut with, for example, a focused ion beam system or a cross polisher.

Second, the cross section of the cut sample is observed under the SEM. Through this observation, the SEM image in the cross section of the cut sample is obtained. In the observation under the SEM, magnification is adjusted such that 100 or more diamond grains are included in a measured view. SEM images are obtained at five locations in the cross section of the cut sample.

Third, image processing is performed on the SEM image, thereby calculating a ratio of diamond grains included in the measured view. This image processing is performed by binarization of the SEM image with, for example, Win ROOF ver. 7.4.5 or WinROOF2018 available from Mitani Corporation. A dark field in the SEM image after binarization corresponds to a region where diamond grains are present. A value obtained by dividing the area of the dark field by the area of the measured region is considered as a volume ratio of diamond grains in the sintered material of cutting edge portion 20.

The boron concentration in the diamond grains is more than or equal to 0.001 mass % and less than or equal to 0.9 mass %. The boron concentration in the binder is more than or equal to 0.5 mass % and less than or equal to 40 mass %. The boron concentration in the binder is preferably more than or equal to the boron concentration in the diamond grains (i.e., a value obtained by subtracting the boron concentration in the diamond grains from the boron concentration in the binder is preferably more than or equal to 0 mass %). A value obtained by subtracting the boron concentration in the diamond grains from the boron concentration in the binder is preferably less than or equal to 30 mass %.

The boron concentration in the diamond grains may be more than or equal to 0.005 mass % and less than or equal to 0.1 mass %, or may be more than or equal to 0.6 mass % and less than or equal to 33 mass %. In this case, a value obtained by subtracting the boron concentration in the diamond grains from the boron concentration in the binder is preferably more than or equal to 0.5 mass % and less than or equal to 25 mass %.

The boron concentration in the diamond grains and the boron concentration in the binder are measured by the following method.

In the measurements of the boron concentration in the diamond grains and the boron concentration in the binder, first, a sample is cut at any position of cutting edge portion 20. Second, the cut sample is subjected to acid treatment. Through this acid treatment, substantially all the components of the binder included in the sample are dissolved in acid. In other words, the sample after the acid treatment substantially contains diamond grains alone.

The acid treatment described above is performed with a hydrofluoric-nitric acid solution. The hydrofluoric-nitric acid solution is produced by mixing a 50% concentration solution of hydrogen fluoride and a 60% concentration solution of nitric acid at a ratio of 1:1. The acid treatment described above is performed by immersing the sample in the hydrofluoric-nitric acid solution and holding it at 200° C. for 48 hours.

Third, glow-discharge mass spectrometry is performed on the sample subjected to the acid treatment, thereby measuring the boron concentration in the diamond grains. Induced coupled plasma analysis is performed on the acid used in the heat treatment, thereby measuring the boron concentration in the binder.

<Method of Manufacturing Sintered Material of Cutting Edge Portion 20>

Figure 3:
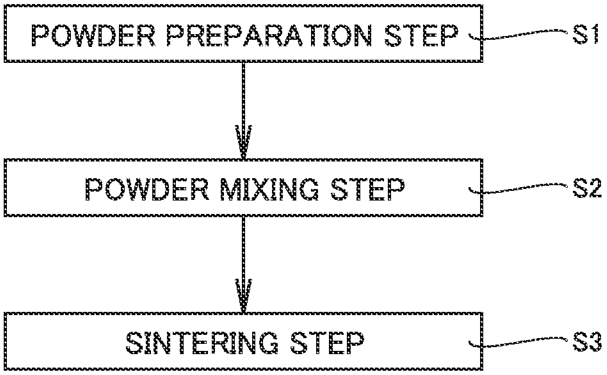
FIG. 3 is a flowchart showing a method of manufacturing a sintered material of a cutting edge portion 20.

FIG. 3 is a flowchart showing a method of manufacturing the sintered material of cutting edge portion 20. As shown in FIG. 3, the method of manufacturing the sintered material of cutting edge portion 20 has a powder preparation step S1, a powder mixing step S2, and a sintering step S3.

In powder preparation step S1, powdered diamond, a powdered binder, and powdered boron are prepared. The powdered diamond is powder of diamond, and the powdered binder is powder made of a material of the binder. The powdered boron is powder of boron. The ratio of powdered diamond, powdered binder, and powdered boron is appropriately selected in accordance with the volume ratio of diamond grains in the sintered material of cutting edge portion 20 and the boron concentrations in the diamond grains and the binder.

In powder mixing step S2, the powdered diamond, the powdered binder, and the powdered boron are mixed. This mixing is performed with, for example, an attritor or a ball mill. However, the mixing method is not limited thereto. The mixture of powdered diamond, powdered binder, and powdered boron will be referred to as a "powder mixture" below.

In sintering step S3, the powder mixture is sintered. This sintering is performed by placing the powder mixture in a container and holding the powder mixture at a prescribed sintering temperature at a prescribed sintering pressure. This container is made of a high-melting-point metal, such as tantalum or niobium, for preventing introduction of impurities into the powder mixture (sintered material).

The sintering pressure is controlled to increase as the holding time elapses. Sintering step S3 may be divided into a plurality of steps. The plurality of steps include, for example, a first step and a second step. The second step is performed after the first step. The sintering pressure in the second step is higher than the sintering pressure in the first step. The sintering temperature in the second step is higher than the sintering temperature in the first step. The holding time in the second step is shorter than the holding time in the first step.

The sintering pressure in the first step is, for example, 3 GPa. The sintering pressure in the second step is, for example, 7 GPa. The sintering temperature in the first step is, for example, 1200° C. The sintering temperature in the second step is, for example, 1500° C. The holding time in the first step is appropriately selected in accordance with the boron concentration in diamond grains included in the sintered material of cutting edge portion 20 and the boron concentration in the binder included in this sintered material. As the holding time in the first step is longer, the boron concentration in diamond grains included in the sintered material of cutting edge portion 20 increases, and the boron concentration in the binder included in the sintered material decreases. The holding time in the second step is, for example, one minute.

(Effects of Cutting Tool According to Embodiments)

The effects of cutting insert 100 will be described below.

The oxidation resistance of diamond grains is improved owing to the presence of boron in the diamond grains, leading to an improved abrasion resistance of cutting edge portion 20. According to the insight gained by the present inventors, a boron concentration of less than 0.001 mass % in the diamond grains results in poor effects of improving oxidation resistance of diamond grains by boron. In contrast, if the boron concentration in the diamond grains exceeds 0.9 mass %, the hardness of the diamond grains decreases due to an excessive amount of boron in the diamond grains, rather decreasing the abrasion resistance of cutting edge portion 20.

In sintering step S3, the powdered binder melts, and the powdered boron is dissolved in the molten binder. Subsequently, part of the powdered diamond is dissolved in the molten binder, and the diamond grains are reprecipitated, leading to progression of coupling (necking) of the diamond grains. Boron in the dissolved binder acts as the nucleus in the reprecipitation, and accordingly, necking of diamond grains is less likely to occur if the boron concentration in the binder is less than 0.5 mass %.

On the other hand, according to the insight gained by the present inventors, if the boron concentration in the binder exceeds 40 mass %, reprecipitation of the diamond grains is rather less likely to occur (necking of the diamond grains is less likely to occur). If necking of the diamond grains is insufficient in the sintered material of cutting edge portion 20 (if the gross neck strength between the diamond grains is low), the diamond grains are more likely to come off the sintered material of cutting edge portion 20, resulting in a decreased abrasion resistance.

In cutting insert 100, the boron concentration of the diamond grains included in the sintered material of cutting edge portion 20 is more than or equal to 0.001 mass % and less than or equal to 0.9 mass %, and thus, the oxidation resistance of the diamond grains is improved while maintaining the hardness of the diamond grains. In cutting insert 100, also, the boron concentration in the binder included in the sintered material of cutting edge portion 20 is more than or equal to 0.5 mass % and less than or equal to 40 mass %, and thus, the gross neck strength between the diamond grains can be ensured. In this manner, cutting insert 100 can have an improved abrasion resistance of cutting edge portion 20.

EXAMPLES

Cutting tests conducted to confirm the effects of cutting insert 100 will be described.

Table 1 shows samples provided for the cutting tests. As shown in Table 1, a sample 1 to sample 22 were provided in the cutting tests. In sample 1 to sample 8, a boron concentration in diamond grains included in a sintered material of cutting edge portion 20 was varied with a boron concentration in a binder included in the sintered material being kept uniform (10 mass %).

A condition A1 refers to a condition that the boron concentration in the diamond grains included in the sintered material of cutting edge portion 20 is more than or equal to 0.001 mass % and less than or equal to 0.9 mass %. A condition B1 refers to a condition that the boron concentration in the binder included in the sintered material of cutting edge portion 20 is more than or equal to 0.5 mass % and less than or equal to 40 mass %.

A condition A2 refers to a condition that the boron concentration in the diamond grains included in the sintered material of cutting edge portion 20 is more than or equal to 0.005 mass % and less than or equal to 0.1 mass %. A condition B2 refers to a condition that the boron concentration in the binder included in the sintered material of cutting edge portion 20 is more than or equal to 0.6 mass % and less than or equal to 33 mass %.

In sample 1 to sample 6, condition A1 and condition B1 (condition B2) were met. In sample 1 to sample 4, condition A2 was also met. In sample 7 and sample 8, condition A1 was not met, though condition B1 (condition B2) was met.

In sample 9 to sample 16, a boron concentration in ta binder included in a sintered material of cutting edge portion 20 was varied with a boron concentration in diamond grains included in the sintered material being kept uniform (0.016 mass %).

In sample 9 to sample 14, condition A1 (condition A2) and condition B1 were met. In sample 9 to sample 13, condition B2 was also met. In sample 15 and sample 16, condition B1 was not met, though condition A1 (condition A2) was met.

In sample 1 to sample 16, an average grain size of the diamond grains included in the sintered material of cutting edge portion 20 was 0.5 μm, and a ratio of diamond grains included in the sintered material was 90 volume %. In sample 17 to sample 22, any of an average grain size and a ratio of the diamond grains included in a sintered material of cutting edge portion 20 was different from that of sample 1 to sample 16. In sample 17 to sample 22, condition A1 (condition A2) and condition B1 (condition B32) were met.

TABLE 1

| | Diamond grains | | | Binder | |
|---|---|---|---|---|---|
| | Average grain size (μm) | Volume ratio (vol. %) | Boron concentration (mass %) | Mass ratio of materials in powdered material source (Co:Ti:B) | Boron concentration (mass %) |
| Sample 1 | 0.5 | 90 | 0.003 | 73:15:12 | 10 |
| Sample 2 | 0.5 | 90 | 0.006 | 73:15:12 | 10 |
| Sample 3 | 0.5 | 90 | 0.014 | 73:15:12 | 10 |
| Sample 4 | 0.5 | 90 | 0.016 | 73:15:12 | 10 |
| Sample 5 | 0.5 | 90 | 0.02 | 73:15:12 | 10 |
| Sample 6 | 0.5 | 90 | 0.5 | 73:14.5:12.5 | 10 |
| Sample 7 | 0.5 | 90 | 0.0008 | 73:15:12 | 10 |
| Sample 8 | 0.5 | 90 | 1 | 73:14:13 | 10 |
| Sample 9 | 0.5 | 90 | 0.016 | 84.2:15:0.8 | 0.55 |
| Sample 10 | 0.5 | 90 | 0.016 | 83.8:15:1.2 | 1 |
| Sample 11 | 0.5 | 90 | 0.016 | 78:15:7 | 5 |
| Sample 12 | 0.5 | 90 | 0.016 | 73:15:12 | 10 |
| Sample 13 | 0.5 | 90 | 0.016 | 63:15:22 | 20 |
| Sample 14 | 0.5 | 90 | 0.016 | 50:15:35 | 33 |
| Sample 15 | 0.5 | 90 | 0.016 | 84.5:15:0.5 | 0.4 |
| Sample 16 | 0.5 | 90 | 0.016 | 41:15:44 | 42 |
| Sample 17 | 45 | 90 | 0.014 | 73:15:12 | 10 |
| Sample 18 | 0.5 | 81 | 0.03 | 73:15:12 | 10 |
| Sample 19 | 0.5 | 95 | 0.008 | 73:15:12 | 10 |
| Sample 20 | 52 | 90 | 0.014 | 73:15:12 | 10 |
| Sample 21 | 0.5 | 79 | 0.03 | 73:15:12 | 10 |
| Sample 22 | 0.5 | 99.2 | 0.008 | 73:15:12 | 10 |

In the cutting tests, a first test method, a second test method, and a third test method were used. The first test method was used for evaluations of sample 1 to sample 8, and the second test method was used for evaluations of sample 9 to sample 16. The third test method was used for evaluations of sample 17 to sample 22. Table 2 shows details of the first test method, the second test method, and the third test method.

TABLE 2

| | Processing method | Workpiece | Workpiece dimensions (mm) | Holder or cutter | Cutting insert | Feed (milling: mm/rev) (turning: mm/t) | Depth of cut (mm) | Coolant | Life determination criteria |
|---|---|---|---|---|---|---|---|---|---|
| First test method | Milling | Quartz glass | 120 × 120 × 120 | In conformity with RF4080R available from Sumitomo Electric Industries, Ltd. | In conformity with SNEW1204ADFR available from Sumitomo Electric Industries, Ltd. | 0.12 | 0.5 | Not used (dry) | Average flank wear width is 250 μm |

TABLE 2-continued

| | Processing method | Workpiece | Workpiece dimensions (mm) | Holder or cutter | Cutting insert | Feed (milling: mm/rev) (turning: mm/t) | Depth of cut (mm) | Coolant | Life determination criteria |
|---|---|---|---|---|---|---|---|---|---|
| Second test method | Turning | Glass-containing resin | ϕ 80 × 150 (outside-diameter cutting) | In conformity with CSRP R3225-N12 available from Sumitomo Electric Industries, Ltd. | In conformity with SPGN120308 available from Sumitomo Electric Industries, Ltd. | 0.1 | 0.4 | Used (wet) | Average flank wear width is 200 μm |
| Third test method | Milling | Glass-containing resin | 80 × 80 × 80 | In conformity with RF4160R available from Sumitomo Electric Industries, Ltd. | In conformity with SNEW1204ADFR available from Sumitomo Electric Industries, Ltd. | 0.2 | 0.35 | Not used (dry) | Average flank wear width is 250 μm |

Table 3 shows the results of the cutting tests. As shown in Table 3, sample 1 to sample 6 and sample 9 to sample 14 showed long tool life. Contrastingly, in sample 7, sample 8, sample 15, and sample 16, breakage (referred to as "initial breakage" below) occurred in cutting edge portion 20 at the initial start of cutting.

As described above, condition A1 and condition B1 were met in sample 1 to sample 6 and sample 9 to sample 14, whereas one of condition A1 and condition B1 was not met in sample 7, sample 8, sample 15, and sample 16. This comparison reveals that the tool life of cutting insert 100 is improved as both of condition A1 and condition B1 are met.

Sample 2 to sample 5 showed long tool life compared with sample 1 and sample 6. Sample 10 to sample 13 showed long tool life compared with sample 9 and sample 14.

As described above, both of condition A2 and condition B2 were additionally met in sample 2 to sample 5 and sample 10 and sample 13, whereas any of condition A2 and condition B2 was not met in sample 1, sample 6, sample 9, and sample 14. This comparison reveals that the tool life of cutting insert 100 is improved further as condition A2 and condition B2 are additionally met.

Sample 17 to sample 22 each showed long tool life. As described above, condition A1 (condition A2) and condition B1 (condition B2) were met in sample 17 to sample 22.

A condition C refers to a condition that the volume ratio of the diamond grains included in the sintered material of cutting edge portion 20 is more than or equal to 80% and less than or equal to 99%. A condition D is a condition that the average grain size of the diamond grains included in the sintered material of cutting edge portion 20 is more than or equal to 0.1 μm and less than or equal to 50 μm. Condition C and condition D were met in sample 17 to sample 19, whereas one of condition C and condition D was not met in sample 20 to sample 22.

Sample 17 to sample 19 showed long tool life compared with sample 20 to sample 22. This comparison reveals that the tool life of cutting insert 100 is improved further as condition C and condition D are additionally met.

TABLE 3

| | Evaluation method | Tool life (Milling: $cm^3$) (Turning: km) |
|---|---|---|
| Sample 1 | First evaluation method | 500 |
| Sample 2 | First evaluation method | 600 |
| Sample 3 | First evaluation method | 800 |
| Sample 4 | First evaluation method | 1000 |
| Sample 5 | First evaluation method | 650 |
| Sample 6 | First evaluation method | 400 |
| Sample 7 | First evaluation method | Initial breakage |

TABLE 3-continued

| | Evaluation method | Tool life (Milling: $cm^3$) (Turning: km) |
|---|---|---|
| Sample 8 | First evaluation method | Initial breakage |
| Sample 9 | Second evaluation method | 4 |
| Sample 10 | Second evaluation method | 5 |
| Sample 11 | Second evaluation method | 7 |
| Sample 12 | Second evaluation method | 10 |
| Sample 13 | Second evaluation method | 8 |
| Sample 14 | Second evaluation method | 5 |
| Sample 15 | Second evaluation method | Initial breakage |
| Sample 16 | Second evaluation method | Initial breakage |
| Sample 17 | Third evaluation method | 1000 |
| Sample 18 | Third evaluation method | 1200 |
| Sample 19 | Third evaluation method | 1500 |
| Sample 20 | Third evaluation method | 100 |
| Sample 21 | Third evaluation method | 80 |
| Sample 22 | Third evaluation method | 75 |

(Variations)

The case in which the binder included in the sintered material of cutting edge portion 20 is cobalt has been described as an example, but the binder included in the sintered material of cutting edge portion 20 is not limited to cobalt.

The binder included in the sintered material of cutting edge portion 20 may include at least one selected from the group consisting of a simple metal, an alloy, and an intermetallic compound. The simple metal, the alloy, and the intermetallic compound include at least one metallic element selected from the group consisting of a group 4 element (e.g., titanium, zirconium, hafnium) in a periodic table, a group 5 element (e.g., vanadium, tantalum, niobium) in the periodic table, a group 6 element (e.g., chromium, molybdenum, tungsten) in the periodic table, aluminum, iron, silicon, cobalt, and nickel. The periodic table means a so-called long-period periodic table.

The binder included in the sintered material of cutting edge portion 20 may include at least one selected from the group consisting of a compound and a solid solution derived from the compound. This compound includes at least one selected from the group consisting of a simple metal, an alloy, and an intermetallic compound, and at least one selected from the group consisting of nitrogen, carbon, and oxygen.

The simple metal, the alloy, and the intermetallic compound include at least one metallic element selected from the group consisting of a group 4 element in a periodic table, a group 5 element in the periodic table, a group 6 element in the periodic table, aluminum, iron, silicon, cobalt, and nickel.

The case where cutting insert 100 includes substrate 10 has been described above, but cutting insert 100 other than cutting edge portion 20 may also be made of the same sintered material as that of cutting edge portion 20.

It should be understood that the embodiments disclosed herein are illustrative in all respects and are not restrictive. The scope of the present invention is defined not by the embodiments described above but by the claims, and is intended to include all modifications within the meaning and scope equivalent to the claims.

REFERENCE SIGNS LIST

10 substrate; 10*a* top surface; 10*b* bottom surface; 10*c* side surface; 10*d* attachment portion; 11 through-hole; 20 cutting edge portion; 20*a* rake face; 20*b* flank face; 20*c* cutting edge; 21 back metal; 100 cutting insert; S1 powder preparation step; S2 powder mixing step; S3 sintering step.

The invention claimed is:

1. A sintered material comprising:

diamond grains; and a binder, wherein a boron concentration in the diamond grains is more than or equal to 0.001 mass % and less than or equal to 0.9 mass %, a boron concentration in the binder is more than or equal to 0.5 mass % and less than or equal to 40 mass %, and a ratio of the diamond grains in the sintered material is more than or equal to 79 volume % and less than or equal to 99.2 volume %.

2. The sintered material according to claim 1, wherein the boron concentration in the diamond grains is more than or equal to 0.005 mass % and less than or equal to 0.1 mass %, and the boron concentration in the binder is more than or equal to 0.6 mass % and less than or equal to 33 mass %.

3. The sintered material according to claim 1, wherein an average grain size of the diamond grains is more than or equal to 0.1 μm and less than or equal to 50 μm, and a ratio of the diamond grains in the sintered material is more than or equal to 80 volume % and less than or equal to 99 volume %.

4. The sintered material according to claim 1, wherein the binder includes at least one selected from the group consisting of a simple metal, an alloy, and an intermetallic compound, and the simple metal, the alloy, and the intermetallic compound include at least one metallic element selected from the group consisting of a group 4 element in a periodic table, a group 5 element in the periodic table, a group 6 element in the periodic table, iron, aluminum, silicon, cobalt, and nickel.

5. The sintered material according to claim 1, wherein the binder includes at least one selected from the group consisting of a compound and a solid solution derived from the compound, the compound includes at least one selected from the group consisting of a simple metal, an alloy, and an intermetallic compound, and at least one selected from the group consisting of nitrogen, carbon, and oxygen, and the simple metal, the alloy, and the intermetallic compound include at least one metallic element selected from the group consisting of a group 4 element in a periodic table, a group 5 element in the periodic table, a group 6 element in the periodic table, iron, aluminum, silicon, cobalt, and nickel.

6. The sintered material according to claim 1, wherein the binder includes at least cobalt.

7. A cutting tool comprising a cutting edge portion, wherein the cutting edge portion is made of the sintered material according to claim 1.

8. The sintered material according to claim 1, wherein the boron concentration in the diamond grains is more than or equal to 0.003 mass % and less than or equal to 0.03 mass %.

* * * * *